United States Patent
Yamazaki et al.

(10) Patent No.: US 6,931,300 B2
(45) Date of Patent: Aug. 16, 2005

(54) CONTROL DEVICE FOR INJECTION MOLDER DETERMINING WHETHER USER OF INJECTION MOLDER IS REGISTERED

(75) Inventors: Takashi Yamazaki, Mishima (JP); Makoto Nishizawa, Numazu (JP); Hiroshi Katsuta, Gotenba (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/693,910

(22) Filed: Oct. 28, 2003

(65) Prior Publication Data

US 2004/0088066 A1 May 6, 2004

(30) Foreign Application Priority Data

Oct. 29, 2002 (JP) .................................... 2002-314577
Sep. 26, 2003 (JP) .................................... 2003-335393

(51) Int. Cl.[7] .................. G05B 15/00; B29C 45/00; G06F 19/00
(52) U.S. Cl. ..................... 700/200; 700/204; 700/83
(58) Field of Search .......................... 700/83, 95, 200, 700/204; 345/741–743

(56) References Cited

U.S. PATENT DOCUMENTS 5,424,844 A * 6/1995 Koyanagi et al. ........... 358/296
6,556,892 B2 * 4/2003 Kuroki et al. .............. 700/245
6,718,378 B1 * 4/2004 Machida .................... 709/223
2003/0038984 A1 * 2/2003 Ohkawa ..................... 358/462
2003/0046560 A1 * 3/2003 Inomata et al. ............. 713/189
2003/0074590 A1 * 4/2003 Fogle et al. ................ 713/320

FOREIGN PATENT DOCUMENTS

JP          2001-145947          5/2001
JP          2001129864 A   *   5/2004   .......... B29C/45/76

* cited by examiner

*Primary Examiner*—Leo Picard
*Assistant Examiner*—Ryan Jarrett
(74) *Attorney, Agent, or Firm*—Pillsbury Winthrop Shaw Pittman LLP (57) ABSTRACT

A control device which controls an industrial machine according to an aspect of the invention includes a unit which determines whether the user is a registrant registered in advance, a unit which, when the user is determined to be the registrant, selects one of a setting permission state and a setting inhibition state individually for at least one operating condition of the industrial machine in accordance with the operation of the registrant, and a setting unit which accepts from the registrant a setting of the operating condition for which the setting permission state is selected.

28 Claims, 11 Drawing Sheets

* Setting log *

| | Product code | | Memory 31 | No conversion | 99/06/04 10:29 |
|---|---|---|---|---|---|
| | | | | | Operating |

| | Year/month/date/hour/minute | Setting value change item | Memory | Current setting value | Previous setting value | Permission |
|---|---|---|---|---|---|---|
| 1 | 99/06/04 11:23 | LS 4B | 31 | 080.00 mm | 081.00 mm | ACI |
| 2 | 99/06/04 11:23 | VI 1 | 31 | 050.0 mm/s | 051.0 mm/s | ACI |
| 3 | 99/06/04 11:23 | VI 2 | 31 | 140.0 mm/s | 141.0 mm/s | ACI |
| 4 | 99/06/04 11:23 | PI 1 | 31 | 170.0 Mpa | 171.0 Mpa | ACI |
| 5 | 99/06/04 11:23 | VI 4 | 31 | 080.0 mm/s | 081.0 mm/s | ACI |
| 6 | 99/06/04 11:23 | VI 3 | 31 | 100.0 mm/s | 101.0 mm/s | ACI |
| 7 | 99/06/04 11:23 | VH 2 | 31 | 040.0 mm/s | 041.0 mm/s | EPT |
| 8 | 99/06/04 11:23 | LS 4C | 31 | 060.00 mm | 061.00 mm | EPT |
| 9 | 99/06/04 11:23 | PH 4 | 31 | 030.0 Mpa | 031.0 Mpa | EPT |
| 10 | 99/06/04 11:23 | medium timer | 31 | 0008.0 s | 0009.0 s | EPT |
| 11 | 99/06/04 11:23 | coolin timer | 31 | 0018.0 s | 0019.0 s | EPT |
| 12 | 99/06/04 11:22 | PH 3 | 31 | 040.0 Mpa | 041.0 Mpa | EPT |
| 13 | 99/06/04 11:22 | PI 2 | 31 | 190.0 Mpa | 191.0 Mpa | SMH |
| 14 | 99/06/04 11:22 | VI 5 | 31 | 040.0 mm/s | 041.0 mm/s | SMH |
| 15 | 99/06/04 11:22 | LS 4D | 31 | 030.00 mm | 031.00 mm | SMH |
| 16 | 99/06/04 11:22 | LS 4 | 31 | 10.00 mm | 11.00 mm | SMH |
| 17 | 99/06/04 11:22 | VH 1 | 31 | 050.0 mm/s | 051.0 mm/s | SMH |
| 18 | 99/06/04 11:22 | PH 2 | 31 | 050.0 Mpa | 051.0 Mpa | SMH |

CONTROL DEVICE FOR INJECTION MOLDER DETERMINING WHETHER USER OF INJECTION MOLDER IS REGISTERED

CROSS-REFERENCE TO RELATED APPLICATIONS

This application is based upon and claims the benefit of priority from the prior Japanese Patent Applications No. 2002-314577, filed Oct. 29, 2002; and No. 2003-335393, filed Sep. 26, 2003, the entire contents of both of which are incorporated herein by reference.

BACKGROUND OF THE INVENTION

1. Field of the Invention

The present invention relates to a control device for an industrial machine.

2. Description of the Related Art

The display area of the display device of an injection molder is generally limited. Patent reference 1 (Jpn. Pat. Appln. KOKAI Publication No. 2001-145947) discloses a display device for an injection molder that almost simultaneously displays pieces of information on a main screen region and sub screen region.

In patent reference 1, the screen of the display device serving as the human interface of the injection molder is divided into two. One of the divided screens serves as a dedicated main screen region, and the other screen serves as a dedicated sub screen region. The main screen region comprises a controller function switch capable of operating the controller function of the injection molder, and a setter capable of setting a molding condition of the injection molder. The main device region displays monitoring data. The sub screen region displays various data such as monitoring data to be displayed in succession, independently of the main screen region.

On the display device of the injection molder, even if the sub screen region is displayed, the main screen region is not hidden. On the display device of the injection molder, the main screen region and sub screen region can be freely combined and displayed. An user can display necessary information without any cumbersome operation, and efficiently perform setting of the molding condition of the injection molder and check of an operating state or the like.

The display device of the injection molder in patent reference 1 does not consider any security in setting the molding condition. Any user who uses the injection molder can change the setting value of molding condition. Free setting of the molding condition of the injection molder by any user poses a problem that appropriate setting value is changed to make high-reliability work difficult or the molding condition must be newly set every time the user is changed.

BRIEF SUMMARY OF THE INVENTION

An aspect of the present invention is made in consideration of the above situation, and has as its object to provide a control device for an industrial machine that enhances the security of setting a operating condition.

According to the aspect of the present invention, a control device which controls an industrial machine comprises a unit which determines whether an user is a registrant registered in advance, a unit which, when the user is determined to be the registrant, selects one of a setting permission state and a setting inhibition state individually for at least one operating condition of the industrial machine in accordance with operation of the registrant, and a setting unit which accepts from the registrant a setting of the operating condition for which the setting permission state is selected.

DETAILED DESCRIPTION OF THE INVENTION

Preferred embodiments of the present invention will be described below with reference to the several views of the accompanying drawing.
(First Embodiment)

The first embodiment will describe a control device for an industrial machine that allows only a registrant registered in advance to set the operating conditions of the industrial machine.

The first embodiment will exemplify an injection molder as an industrial machine. However, the industrial machine is not limited to the injection molder, and may be another machine such as a machine tool. Examples of the industrial machine are an injection molder, extruder, machine tool, die casting machine, robot, semiconductor manufacturing device, and printing device.

In the first embodiment, at least one operating condition is set by the control device.

The first embodiment will exemplify molding conditions as the operating conditions of the industrial machine. However, the operating conditions are not limited to molding conditions, and may be other conditions.

Figure 1:
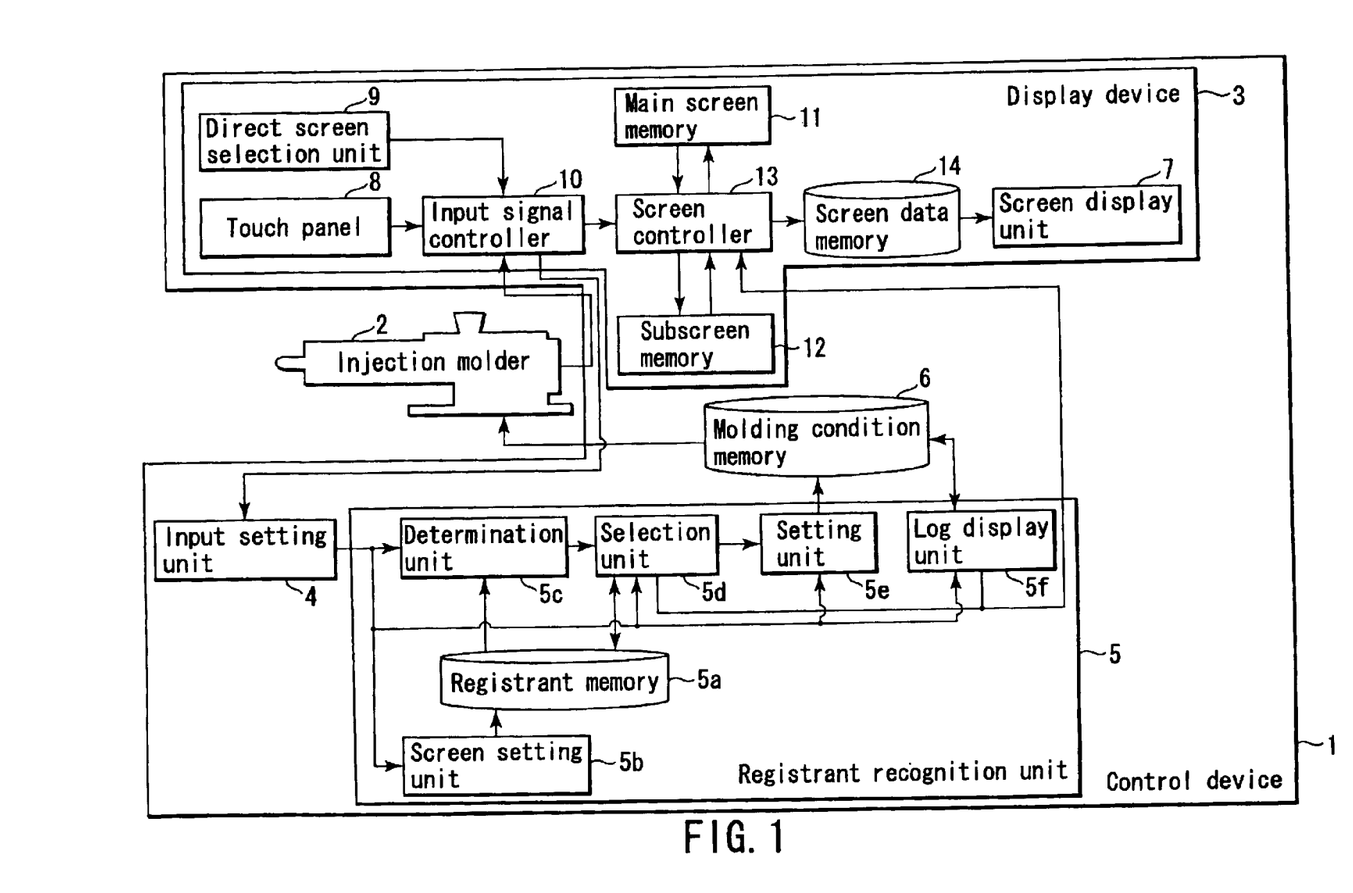
FIG. 1 is a block diagram showing an example of a control device for an industrial machine according to the first embodiment of the present invention.

FIG. 1 is a block diagram showing an example of a control device for an industrial machine according to the first embodiment of the present invention.

A control device 1 controls an injection molder 2. The control device 1 comprises a display device 3, input setting unit 4, registrant recognition unit 5, and molding condition memory 6.

The display 3 comprises a screen display unit 7, touch panel 8, direct screen selection unit 9, input signal controller 10, main screen memory 11, sub screen memory 12, screen controller 13, and screen data memory (e.g., VRAM) 14.

The screen display unit 7 is, e.g., a liquid crystal panel.

The touch panel 8 is transparent and is attached to the screen display unit 7.

The input signal controller 10 receives a signal from the touch panel 8, a signal from the direct screen selection unit 9, and various detection signals from the injection molder 2. The input signal controller 10 outputs the received signals to the screen controller 13 or input setting unit 4.

The main screen memory 11 stores main screen data.

The sub screen memory 12 stores sub screen data.

When the screen controller 13 receives, via the input signal controller 10, a signal which requests screen display, the screen controller 13 reads out the main screen data from the main screen memory 11 in accordance with the screen display request signal, and reads out the sub screen data from the sub screen memory 12.

The screen controller 13 creates screen data on the basis of the main screen data and sub screen data, and stores the screen data in the screen data memory 14.

The screen controller 13 creates screen data on the basis of data input from the registrant recognition unit 5, and stores the created screen data in the screen data memory 14.

The screen display unit 7 displays the screen data stored in the window data memory 14.

The input setting unit 4 receives, via the touch panel 8 and input signal controller 10, information on molding conditions and their security, such as an ID (IDentification code), password (password code), and molding condition setting values.

The registrant recognition unit 5 comprises a registrant memory 5a, screen setting unit 5b, determination unit 5c, selection unit 5d, setting unit 5e, and log display unit 5f.

When molding conditions stored in the molding condition memory 6 are to be rewritten, the registrant recognition unit 5 determines whether an user is a registrant registered in advance. If the user is determined to be the registrant, the registrant recognition unit 5 selects the setting permission state or setting inhibition state of molding conditions in accordance with the operation of the registrant. When the setting permission state is selected, the registrant recognition unit 5 accepts the settings of molding conditions from the user, and changes the setting values of molding conditions stored in the molding condition memory 6.

The registrant memory 5a stores registrant information used to recognize the registrant, such as a registrant ID and password.

The registrant memory 5a stores screen setting information representing a screen capable of selecting the setting permission state or setting inhibition state for each registrant.

The registrant memory 5a stores information representing which of the setting permission state and setting inhibition state has been selected.

The screen setting unit 5b stores the screen setting information in the registrant memory 5a on the basis of a signal input via the input setting unit 4.

The determination unit 5c determines whether the user is the registrant on the basis of user information input via the input setting unit 4 and the registrant information stored in the registrant memory 5a.

For example, the determination unit 5c determines that the user is the registrant when an ID and password input by the user coincide with a registered ID and password.

When the user is determined to be the registrant, the selection unit 5d selects either the setting permission state or setting inhibition state of molding conditions in accordance with the operation contents of the registrant that are input via the input setting unit 4. The selection unit 5d stores information representing the selected state in the registrant memory 5a. Based on the screen setting information in the registrant memory 5a, the selection unit 5d accepts selection of the state of a screen on which the registrant is set to be able to select the setting permission state or setting inhibition state.

When the setting permission state is selected, the setting unit 5e accepts the setting values of molding conditions from the user via the input setting unit 4, and stores the setting values in the molding condition memory 6.

When the setting inhibition state is selected, the setting unit 5e inhibits setting of molding conditions by the user.

The setting unit 5e stores setting log data of molding conditions in the molding condition memory 6.

When the log display unit 5f receives a setting log display signal via the input setting unit 4, the log display unit 5f provides the screen controller 13 with the setting log data stored in the molding condition memory 6. A setting log screen is then displayed on the screen display unit 7.

The injection molder 2 operates on the basis of the setting values of molding conditions stored in the molding condition memory 6.

Figure 2:
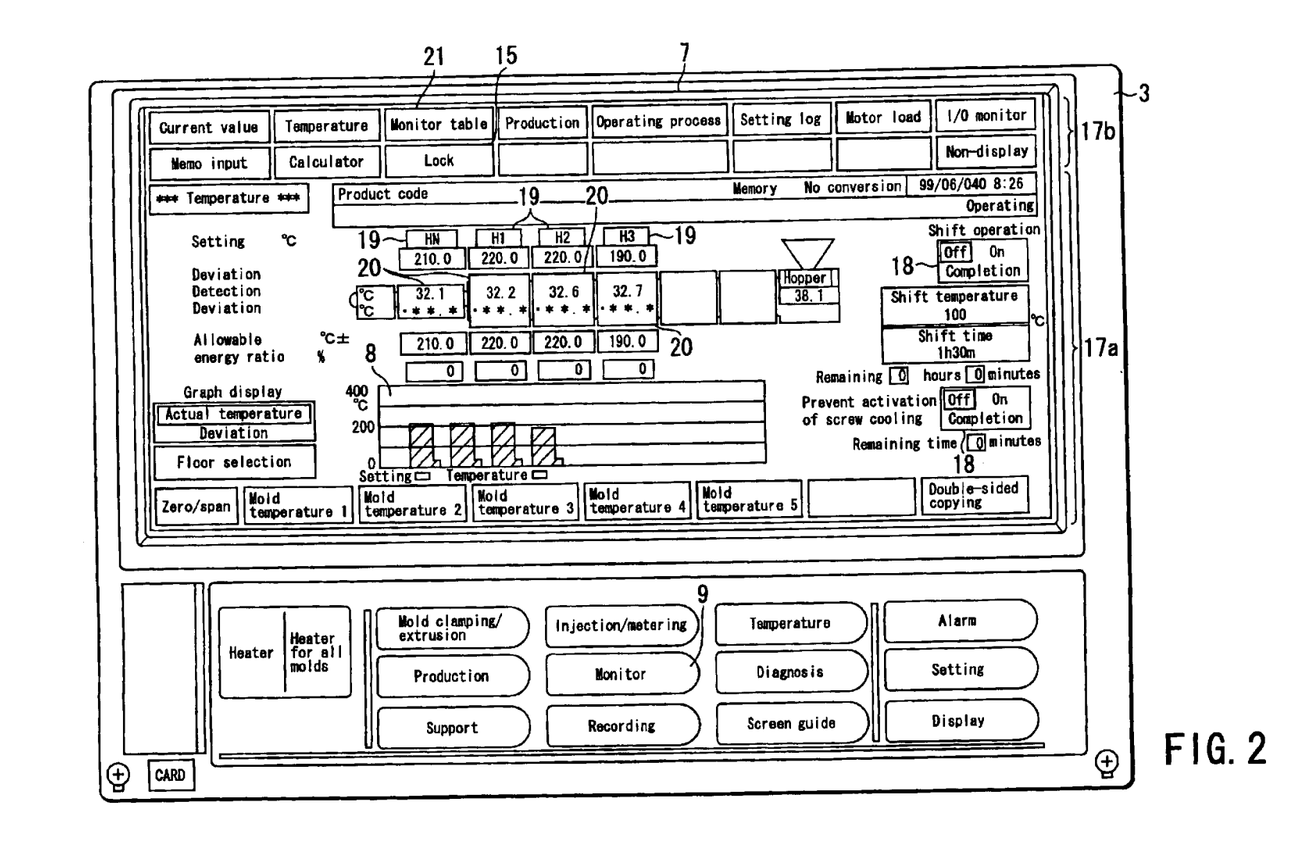
FIG. 2 is a front view showing the first example of the display device of the control device according to the first embodiment.

FIG. 2 is a front view showing the first example of the display device 3 of the control device 1 according to the first embodiment. FIG. 2 illustrates the display device 3 in the setting permission state. In the setting permission state, the display device 3 displays a lock button 15.

Figure 3:
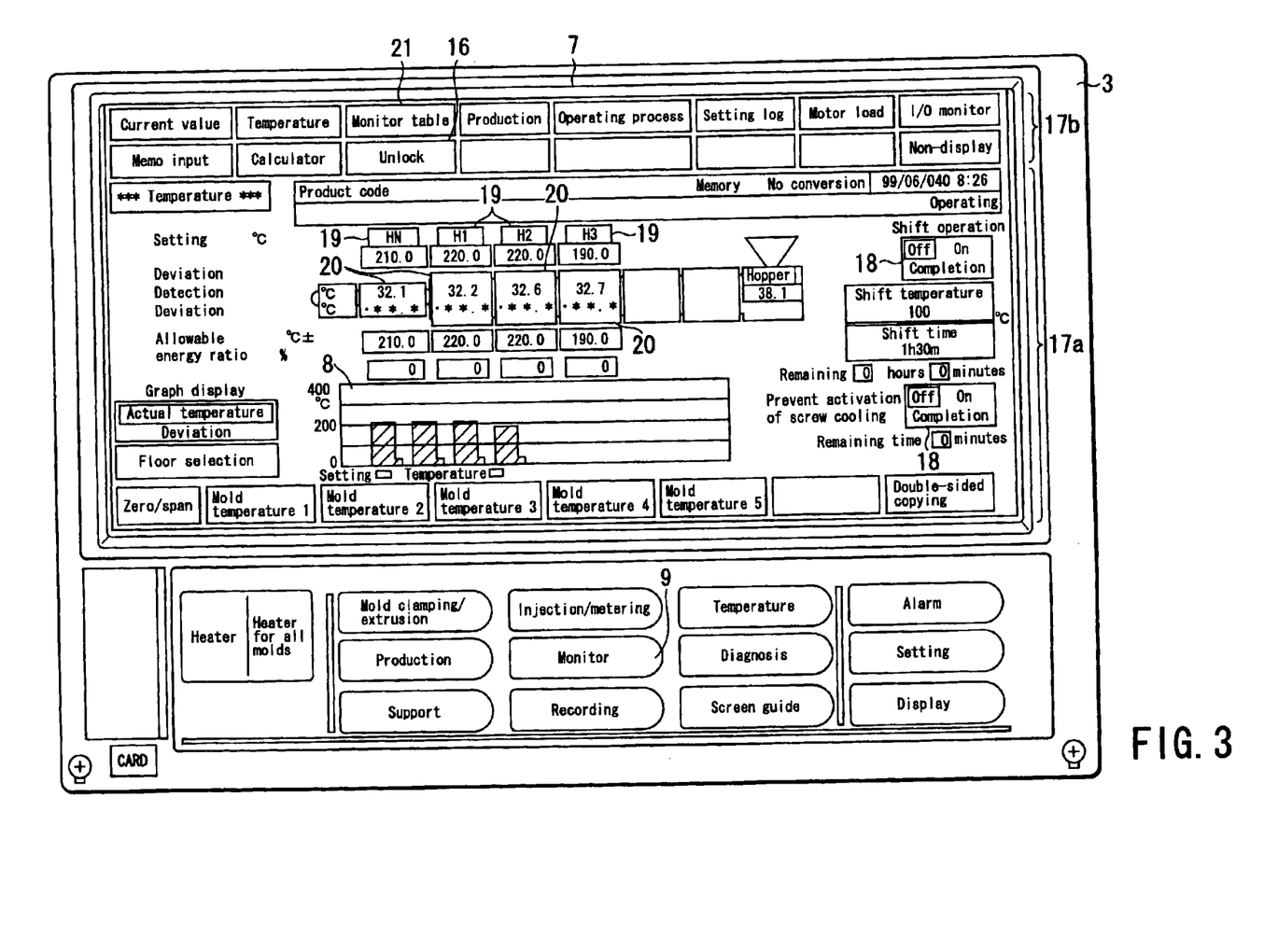
FIG. 3 is a front view showing the second example of the display device of the control device according to the first embodiment.

FIG. 3 is a front view showing the second example of the display device 3 of the control device 1 according to the first embodiment. FIG. 3 illustrates the display device 3 in the setting inhibition state. In the setting inhibition state, the display device 3 displays an unlock button 16.

The display device 3 in FIGS. 2 and 3 comprises the screen display unit 7 and direct screen selection unit 9 as the human interface of the control device 1.

A screen of the screen display 7 is divided into two. One of the divided screens serves as a dedicated main screen region 17a, and the other screen serves as a dedicated sub screen region 17b. The main screen region 17a comprises controller function switches 18 capable of operating the controller function of the injection molder 2, and setters 19 capable of setting the molding conditions of the injection molder 2. The touch panel 8 is used for the controller function switches 18 and setters 19. The main screen region 17a comprises monitoring data display units 20 which display monitoring data. The sub screen region 17b displays various data such as monitoring data to be displayed in succession, e.g., current and past values, independently of the main screen region 17a.

The direct screen selection unit 9 comprises a mold clamping/extrusion button, injection/metering button, temperature button, production button, monitor button, diagnosis button, support button, recording button, screen guide button, alarm button, setting button, and display button. When the button at the direct screen selection unit 9 is touched, a screen corresponding to the touched button is displayed in the main screen region 17a. The direct screen selection unit 9 may be arranged in the main screen region 17a.

The touch panel 8 is attached to the entire sub screen region 17b. The sub screen region 17b comprises a sub screen selection unit 21. The sub screen selection unit 21 comprises a current value button, temperature button, monitor table button, production button, non-display button, and the like.

When the current value button is touched, the sub screen region 17b displays the current state of the injection molder 2 including, e.g., the injection time, cooling time, medium time, screw position, die plate position, extrusion position, injection pressure/back pressure, clamping force, and screw speed.

After the current state of the injection molder 2 is displayed, an arbitrary position in the sub screen region 17b is touched, and then the sub screen region 17b displays again the sub screen selection unit 21 shown in FIG. 2 or 3.

When the temperature button of the sub screen selection unit 21 is touched, the sub screen region 17b displays a temperature corresponding to a hopper position and a temperature deviation.

When the monitor table button of the sub screen selection unit 21 is touched, the sub screen region 17b displays a filling time in accordance with the shot number, metering time, stripping time, cycle time, minimum cushion, dwell switching, injection start, and screw speed.

When the production button of the sub screen selection unit 21 is touched, the sub screen region 17b displays the current number of shots, the number of nondefective shots out of the current number of shots, the remaining number of shots, the total number of products, the number of nondefectives, the number of defectives, the remaining number of products, the working ratio, the lot achievement ratio, the fraction defective, and the remaining production time.

When the non-display button of the sub screen selection unit 21 is touched, a non-display screen appears.

The display contents of the main screen region 17a can be switched by touching a button at the direct screen selection unit 9. The display contents of the sub screen region 17b can be switched by touching a button at the sub screen selection unit 21.

The screen of the display device 3 serves as a split screen. The main screen region 17a serves as a parameter screen, and the sub screen region 17b serves as a menu screen.

The sub screen region 17b displays the lock button 15 operable in the setting permission state, and the unlock button 16 operable in the setting inhibition state.

The lock button 15 and unlock button 16 are alternately displayed by touch operation. In the default state, the unlock button 16 is displayed.

Figure 4:
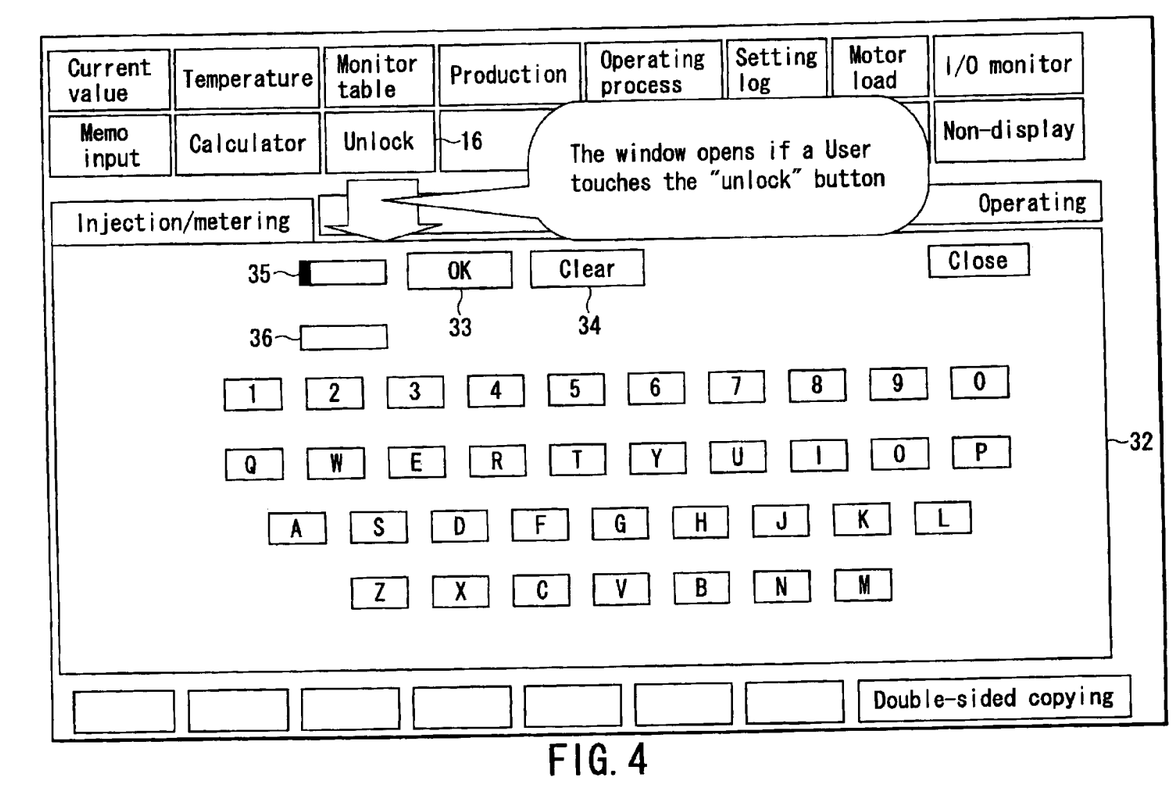
FIG. 4 is a view showing an example of a screen display unit when an unlock button is touched.

FIG. 4 is a view showing an example of the screen display unit 7 when the unlock button 16 is touched. When the unlock button 16 is touched, a window 32 for inputting an ID and password is displayed. The window 32 comprises an ID input unit 35, password input unit 36, OK button 33, and clear button 34.

Figure 5:
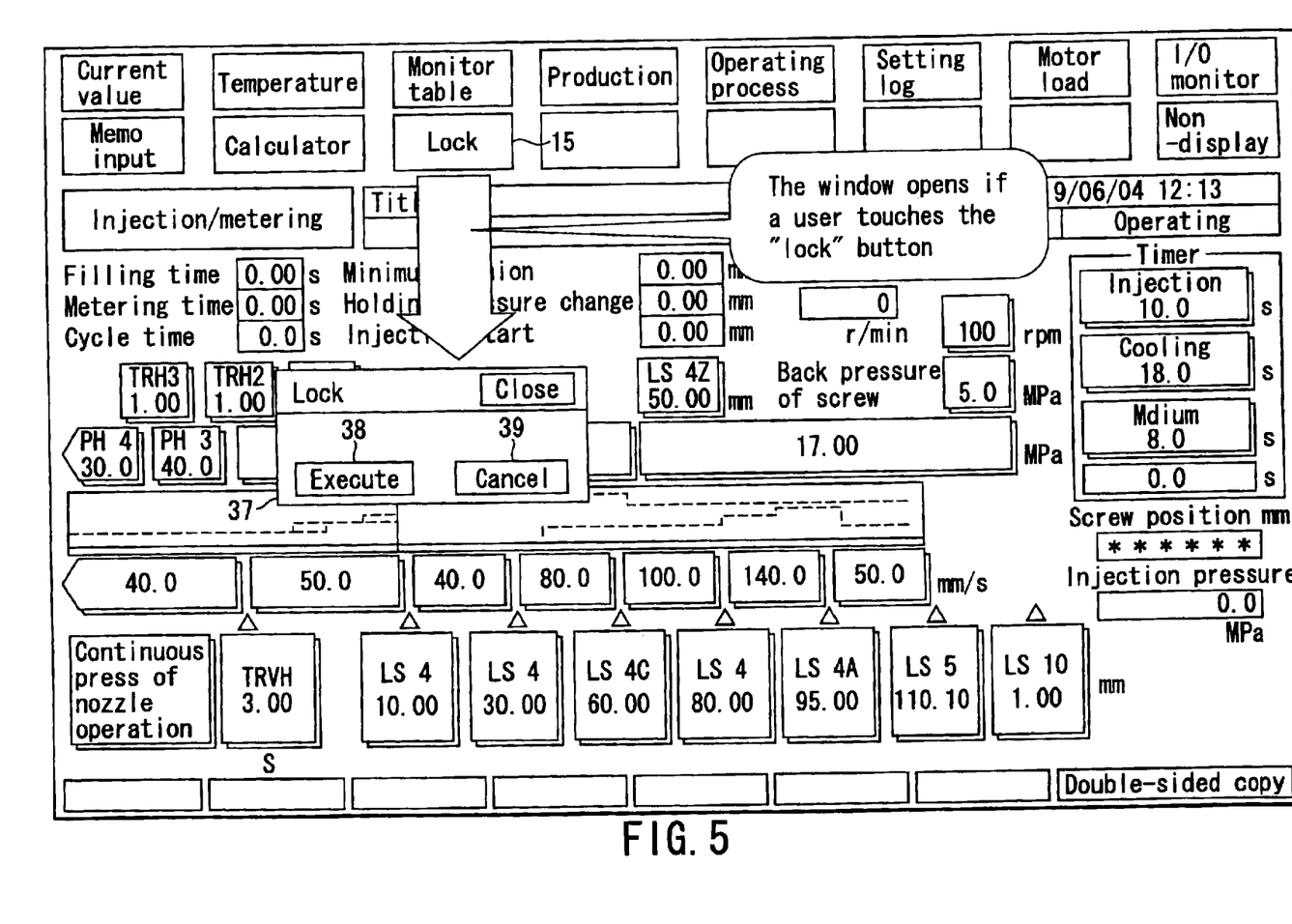
FIG. 5 is a view showing another example of the screen display unit when a lock button is touched.

FIG. 5 is a view showing an example of the screen display unit 35 when the lock button 15 is touched. When the lock button 15 is touched, a lock confirmation window 37 is displayed. The lock confirmation window 37 comprises a lock execution button 38 and lock cancel button 39.

Figure 6:
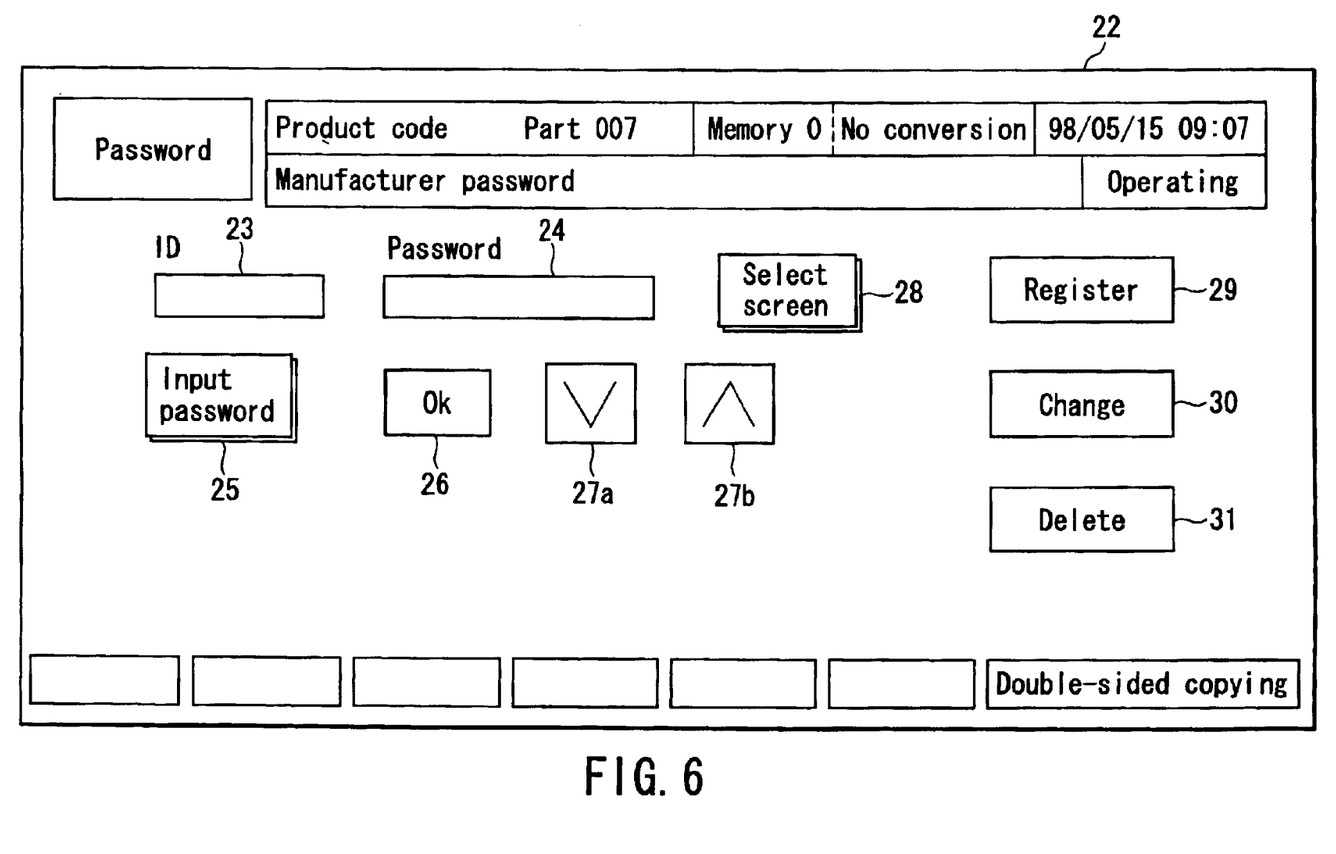
FIG. 6 is a view showing an example of an ID/password setting screen.

FIG. 6 is a view showing an example of an ID/password setting screen.

When the ID and password of the registrant are to be registered, confirmed, changed, or deleted, the main screen region 17a displays an ID/password setting screen 22. The ID/password setting screen 22 comprises an ID input unit 23 used to register, confirm, change, or delete an ID, a password input unit 24 used to register, confirm, change, or delete a password, a password input button 25, an OK button 26, shift buttons 27a and 27b, a screen setting button 28, a registration button 29, a change button 30, and a delete button 31.

Figure 7:
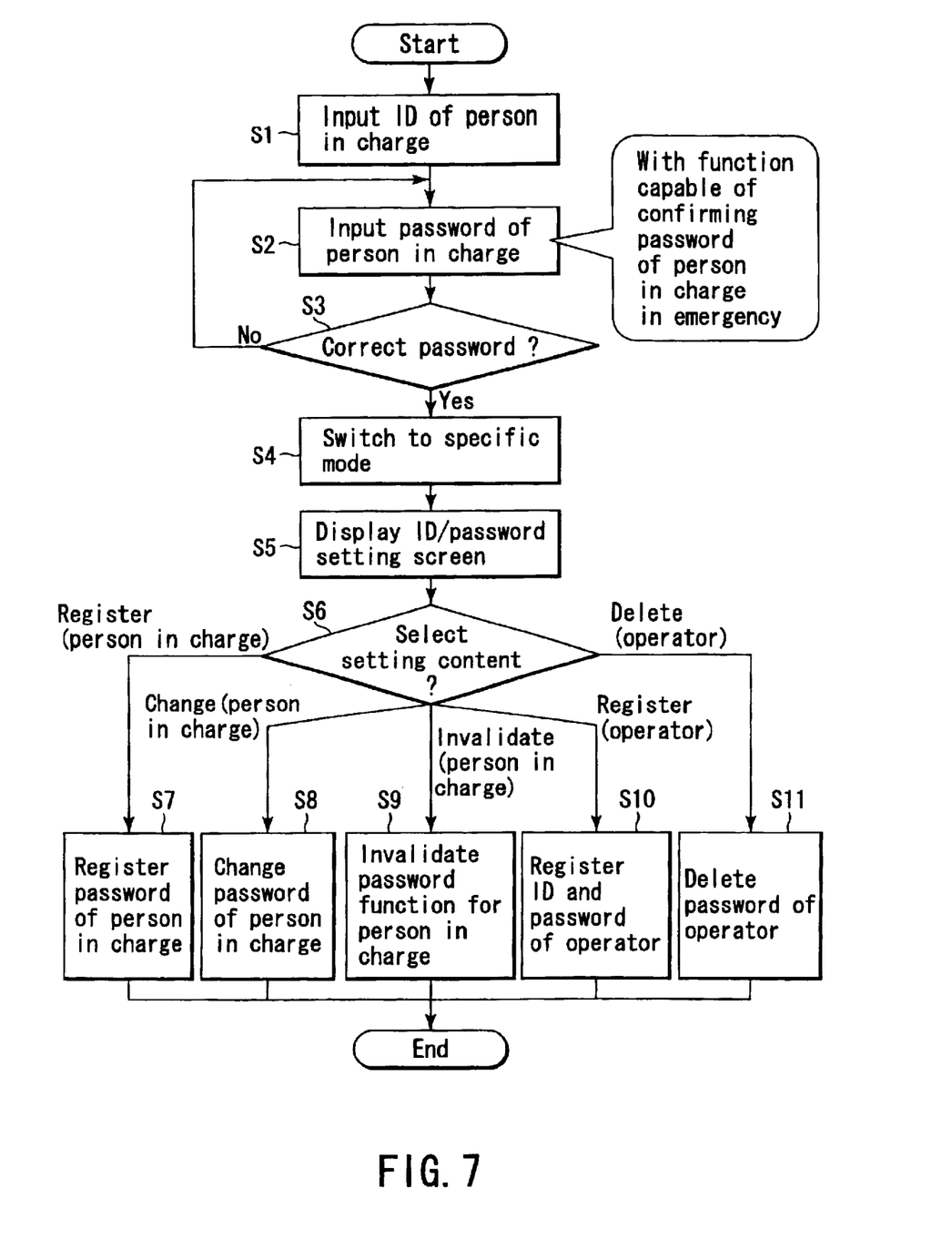
FIG. 7 is a flow chart showing an example of ID/password setting processing.

FIG. 7 is a flow chart showing an example of ID/password setting processing. Registration, change, or invalidation of the password of a person in charge (a person in charge of the customer), and registration or delete of the password of an operator (an operator on the customer's premises) are executed under the control of the person in charge in accordance with processing shown in FIG. 7.

The ID of the person in charge is formed by, e.g., three alphanumeric characters. The password of the person in charge is formed by, e.g., seven alphanumeric characters.

Also in the setting inhibition state, settings within the screen of the display device 3 can be set similarly to function keys.

In step S1, the control device 1 receives the ID of the person in charge. The display device 3 displays the input characters. If the ID of the person in charge is confirmed and determined, a password can be input.

In step S2, the control device 1 receives the password of the person in charge. The display device 3 does not display any input alphanumeric character, and displays, e.g., "*" in accordance with the number of input characters.

In step S3, the control device 1 determines whether the password is correct.

If no password of the person in charge has been set, the control device 1 always selects the setting permission state, and does not display the lock button 15 and unlock button 16 on the menu of the screen of the display device 3.

The screen in FIG. 4 is displayed in a specific mode when setting is permitted by the manufacturer or person in charge or the mode is not an user mode.

If the password is correct, the control device 1 switches to a specific mode in step S4.

For example, if a hidden key which is not displayed in the screen is touched for a predetermined time, the control device 1 switches to a specific mode, and the lock button 15 in the screen is inverted. If the hidden key in the screen is touched again for a predetermined time, the control device 1 switches to a normal mode, and the lock button 15 is normally displayed.

In step S5, the control device 1 displays the ID/password setting screen 22.

In step S6, the control device 1 accepts selection of the setting contents of the ID and password from the person in charge by using the ID/password setting screen 22.

If registration of the password of the person in charge is selected, the control device 1 registers the password of the person in charge in step S7.

Figure 8:
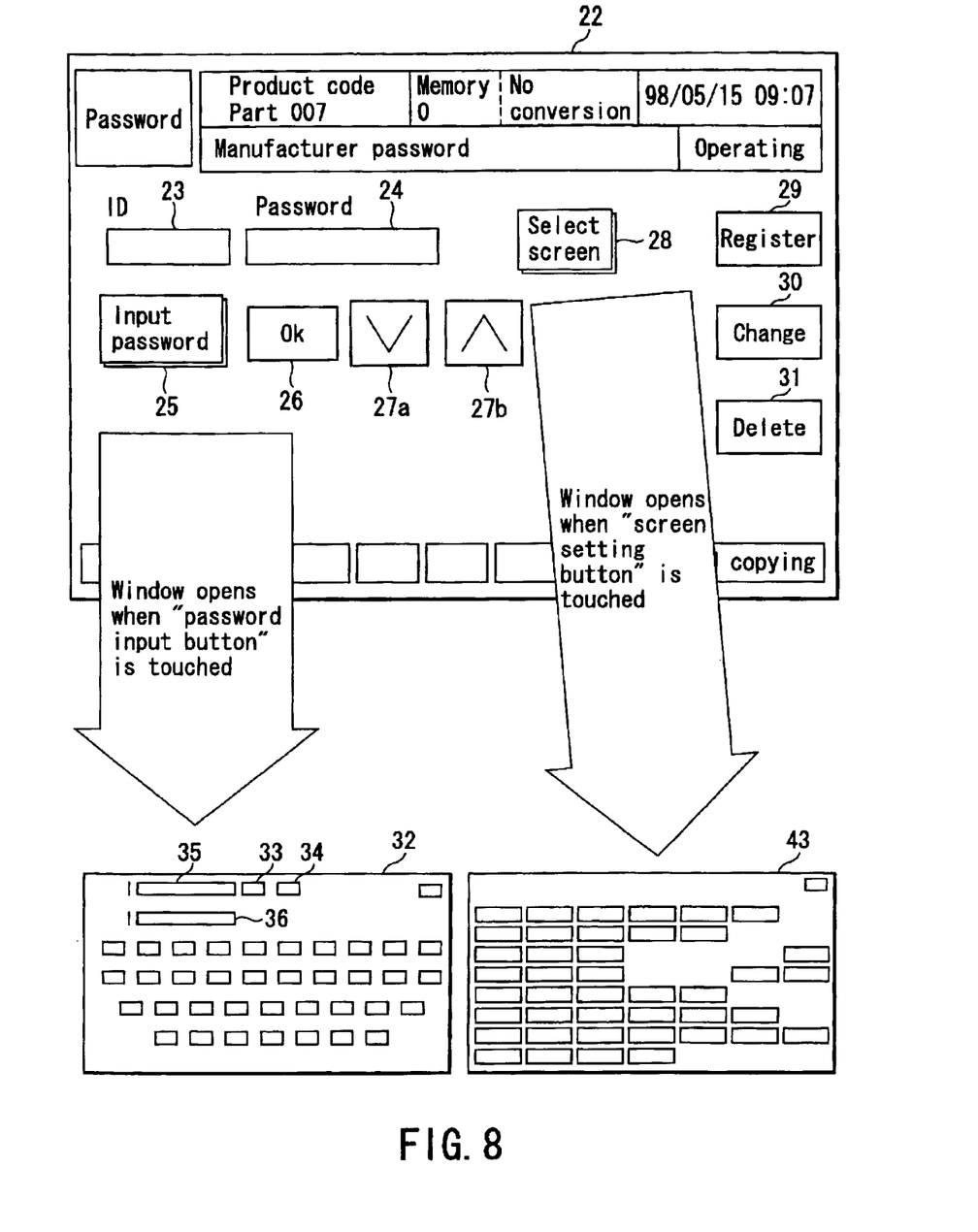
FIG. 8 is a view showing an example of a screen change of the ID/password setting screen.

FIG. 8 is a view showing an example of a screen change of the ID/password setting screen 22. The control device 1 registers, changes, or deletes a password on the basis of operation to the ID/password setting screen 22. When a password is to be registered, changed, or deleted on the ID/password setting screen 22, the password is displayed by alphanumeric characters in order to allow confirming the target password.

For example, to register a password corresponding to an ID "ADM" of the person in charge, the ID "ADM" and a common manufacturer password are input to the control device 1 in the setting permission state. Accordingly, the person in charge can operate the control device 1. After that, the control device 1 switches to a specific mode. The control device 1 displays the ID/password setting screen 22 as the next initial setting page. The password input button 25 of the ID/password setting screen 22 is touched to display a new window 32. The ID "ADM" is input to the ID input unit 35 of the window 32, and the OK button 33 is touched. A password of seven alphanumeric characters is input to the password input unit 36 of the window 32, and the OK button 33 is touched. The registration button 29 of the ID/password setting unit 22 is touched to complete registration. The input password is stored as registrant information in the registrant memory 5a.

Upon the completion of registration, e.g., "*" is displayed at the password input unit 24 of the ID/password setting screen 22 in accordance with the number of password characters. If registration cannot be completed, the password input unit 24 becomes blank, and the registration button 29 changes from blue to red as an error display. If another button or the switch of the direct screen selection unit 9 is touched for re-input, the registration button 29 returns to blue.

When a password is input again because an erroneous password is input to the password input unit 36 of the window 32, input content at the password input unit 36 is deleted with the clear button 34, and then a password is input again.

The screen setting button 28 in the ID/password setting screen 22 is touched to display a window 43. In the window 43, which of screens can be used by the registrant to select the setting permission state or setting inhibition state is set.

For example, when the registrant is a person in charge, a screen capable of selecting the setting permission state or setting inhibition state is not set. The person in charge is set to be able to select the setting permission state or setting inhibition state in all screens.

When the registrant is an operator, a screen capable of selecting the setting permission state or setting inhibition state is set in addition to the ID and password of the operator. Default screens which allow the operator to select the setting permission state or setting inhibition state are all screens. In the default state, the window 43 inversely displays all indices representing the screen.

If change of the password of the person in charge is selected, the control device 1 changes his/her password in step S8. In the following description, the password of the person in charge other than a common manufacturer password is assumed to have been set.

For example, to change the password of the person in charge, his/her ID and password are input to the control device 1 in the setting permission state. Accordingly, the person in charge can operate the control device 1. Thereafter, the control device 1 switches to a specific mode. The control device 1 displays the ID/password setting screen 22 as the next initial setting page. The password input button 25 of the ID/password setting screen 22 is touched to display the window 32. The ID of the person in charge is input to the ID input unit 35 of the window 32, and the OK button 33 is touched. The current password is input to the password input unit 36 of the window 32, and the OK button 33 is touched. The change button 30 of the ID/password setting screen 22 is touched. If the input ID and password of the person in charge coincide with an ID and password which are stored in the registrant memory 5a, his/her input password is deleted. The password input button 25 of the ID/password setting screen 22 is touched to display the window 32. The ID of the person in charge is input to the ID input unit 35 of the window 32, and the OK button 33 is touched. A new password is input to the password input unit 36 of the window 32, and the OK button 33 is touched. The registration button 29 of the ID/password setting screen 22 is touched to complete the change. The new password is stored as registrant information in the registrant memory 5a.

If invalidation of the password function to the password of the person in charge is selected, the control device 1 invalidates the password function for the person in charge in step S8.

For example, to invalidate the password function for the person in charge, his/her ID and password are input to the control device 1 in the setting permission state. The control device 1 switches to a specific mode. The control device 1 displays the ID/password setting screen 22 as the next initial setting page. The password input button 25 of the ID/password setting screen 22 is touched. The control device 1 displays the window 32. The ID of the person in charge is input to the ID input unit 35 of the window 32, the OK button 33 is touched, and then the delete button 31 is touched. If the input ID and password of the person in charge coincide with an ID and password which are stored in the registrant memory 5a, his/her input password is deleted. The password input button 25 of the ID/password setting screen 22 is touched to display the window 32. The ID of the person in charge is input to the ID input unit 35 of the window 32, and the OK button 33 is touched. Specific alphanumeric characters for invalidating the password function are input to the password input unit 36 of the window 32, and the OK button 33 is touched. The registration button 29 of the ID/password setting screen 22 is touched. As the result, the password function for the person in charge is invalidated.

To the contrary, to validate the invalid password function for the person in charge, a parameter is changed by the serviceman of the manufacturer. That is, the serviceman of the manufacturer switches the control device 1 to a parameter mode, and sets a common manufacturer password as the password of the person in charge. As the result, the password function for the person in charge is validated.

In some cases, confirmation of the password of the person in charge is selected in step S6. Although not shown in FIG. 7, if confirmation of the password of the person in charge is selected, the control device 1 switches to a specific mode. The unlock button 16 is inversely displayed, and the unlock button 16 in the screen is touched to display the window 32. The ID of the person in charge is input to the ID input unit 35 of the window 32, and the OK button 33 is touched. The unlock button 16 is touched again. Whereat, the registered password of the person in charge is displayed.

If registration of the ID and password of the operator is selected, the control device 1 registers his/her ID and password in step S10. The ID of the operator is formed by, e.g., three alphanumeric characters. The password of the operator is formed by, e.g., seven alphanumeric characters. The control device 1 comprises an interlocking function of inhibiting the use of the same password. For example, the control device 1 allows registering the IDs and passwords of about 50 operators. The password of the person in charge is assumed to have been set.

For example, to register the ID and password of the operator, the ID and password of the operator are input to the control device 1 in the setting permission state. Accordingly, the operator can operate the control device 1 as a person in charge. The control device 1 switches to a specific mode. The control device 1 displays the ID/password setting screen 22 as the next initial setting page. The password input button 25 of the ID/password setting screen 22 is touched. Accordingly, the window 32 is displayed. The ID of the operator is input to the ID input unit 35 of the window 32, and the OK button 33 is touched. The password of the operator is input to the password input unit 36 of the window 32, and the OK button 33 is touched. The registration button 29 of the ID/password setting screen 22 is touched to complete registration. The input ID and password of the operator are stored as registrant information in the registrant memory 5a.

If delete of the ID and password of the operator is selected, the control device 1 deletes his/her ID and password in step S11.

For example, to delete the ID and password of the operator, his/her ID and password are input to the control device 1 in the setting permission state. As a result, the operator can operate the control device 1 as a person in charge. The control device 1 switches to a specific mode. Accordingly, the control device 1 displays the ID/password setting screen 22 as the next initial setting page. The OK button 26 of the ID/password setting screen 22 is touched. Accordingly, the control device 1 displays the ID and password of the operator which have been registered at the beginning. When the IDs and passwords of a plurality of operators have been registered, the displayed ID and password of an operator can be changed by touching the shift buttons 27a and 27b. If the ID and password of an operator that are to be deleted are displayed, the delete button 31 of the ID/password setting screen 22 is touched, and the delete button 31 flicks. The delete button 31 is touched again to complete delete. The selected ID and password of the operator are deleted from the registrant memory 5a. The IDs and passwords of other operators are displayed.

Figure 9:
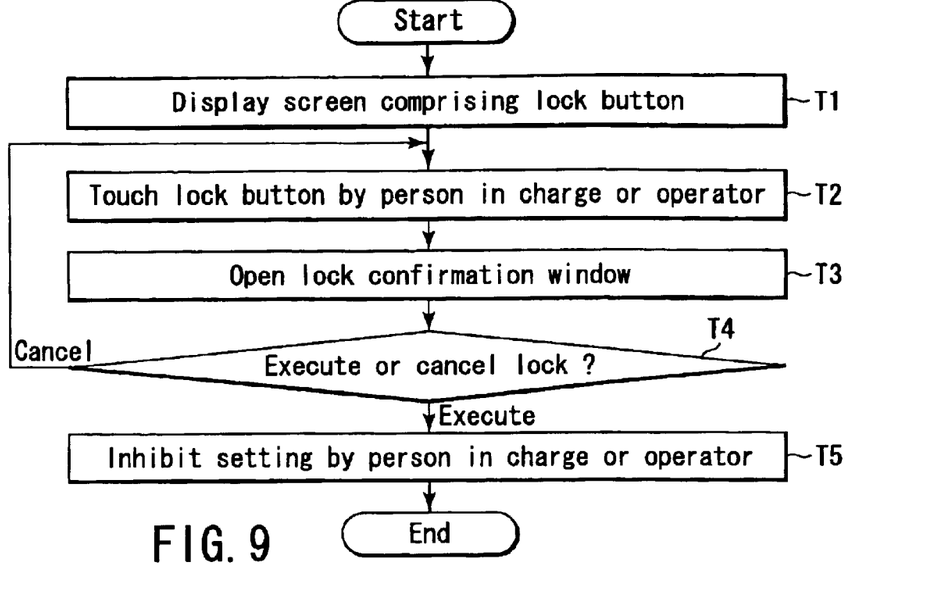
FIG. 9 is a flow chart showing an example of switching processing from a setting permission state to a setting inhibition state.

FIG. 9 is a flow chart showing an example of switching processing from the setting permission state to the setting inhibition state.

In step T1, the control device 1 displays the screen comprising the lock button 15.

In step T2, the control device 1 receives a touch to the lock button 15 by the person in charge or the operator.

In step T3, the control device 1 opens the lock confirmation window 37 shown in FIG. 5. The lock confirmation window 37 displays the lock execution button 38 and lock cancel button 39, as shown in FIG. 5.

In step T4, the control device 1 receives a touch to the lock execution button 38 or lock cancel button 39 by the person in charge or the operator. If the lock cancel button 39 is touched, the processing returns to the state after step T1.

If the lock execution button 38 is touched, the control device 1 displays the screen comprising the unlock button 16 in step T5, and inhibits setting by the person in charge or the operator. Data representing the setting inhibition state is stored as internal backup data regardless of power-off or power-on.

Figure 10:
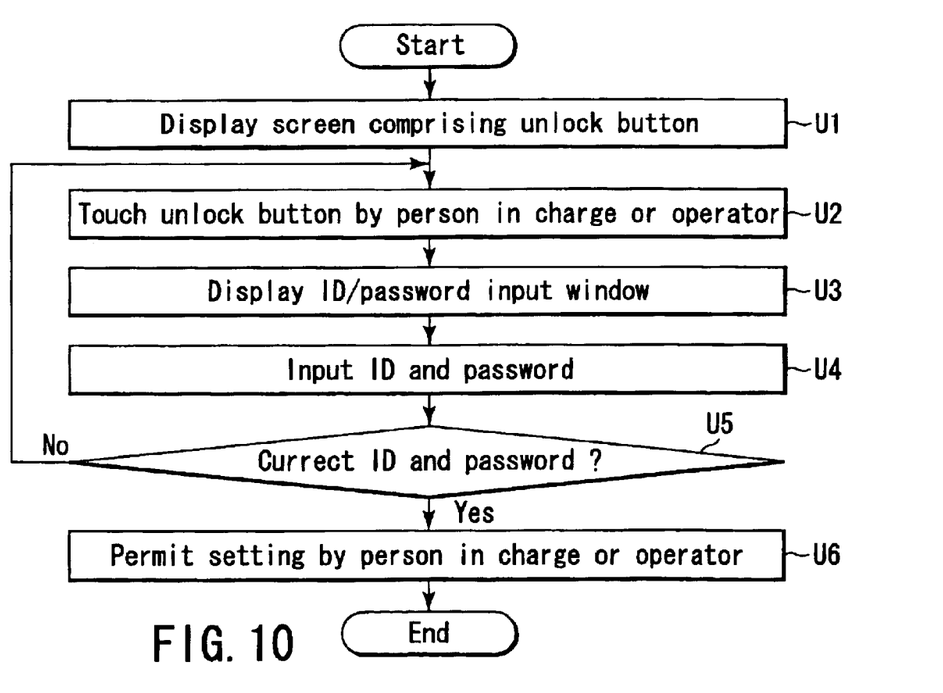
FIG. 10 is a flow chart showing an example of switching processing from the setting inhibition state to the setting permission state.

FIG. 10 is a flow chart showing an example of switching processing from the setting inhibition state to the setting permission state.

In step U1, the control device 1 displays the screen comprising the unlock button 16.

In step U2, the control device 1 receives a touch to the unlock button 16 by the person in charge or the operator.

In step U3, the control device 1 opens the window 32 shown in FIG. 4 and displays "correct ID/password?".

In step U4, the control device 1 receives an ID and password from the person in charge or the operator, and also receives a touch to the OK button 33.

In step U5, the control device 1 determines whether the input ID and password coincide with an ID and password which are stored in the registrant memory 5a. If NO in step U5, the processing returns to the state after step U1.

If YES in step U5, the control device 1 displays the screen comprising the lock button 15 in step U6, and permits setting by the person in charge or the operator. Data representing the setting permission state is stored in the registrant memory 5a as internal backup data regardless of power-off or power-on.

If the setting values of molding conditions are changed, the setting unit 5e of the control device 1 stores, in the molding condition memory 6, current setting values after change, previous setting values before change, and setting log data associated with the ID of the setting person. The log display unit 5f outputs the setting log data to the screen controller 13. The screen controller 13 creates setting log screen data on the basis of the setting log data, and stores the created data in the screen data memory 14. The screen display unit 7 displays a setting log screen on the basis of the setting log screen data.

Figure 11:
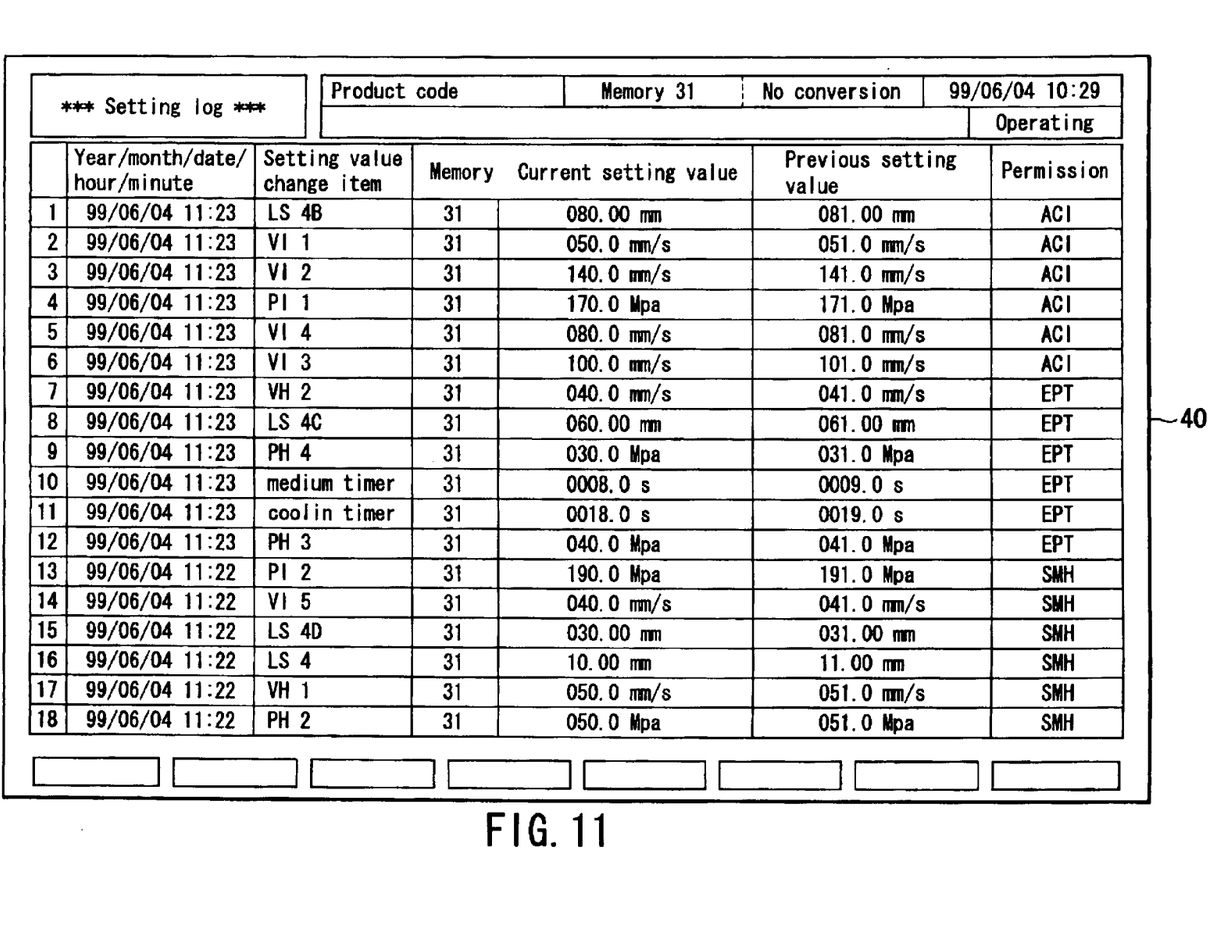
FIG. 11 is a view showing an example of a setting log screen.

FIG. 11 is a view showing an example of the setting log screen.

The ID of the setting person is displayed in the permission column of a setting log screen 40. The ID of the setting person is the ID of a person which has performed setting operation in the setting permission state.

As described above, in the first embodiment, the ID and password of a registrant such as the person in charge or the operator are registered in advance. When the registered ID and password coincide with an ID and password which are input by the user, the setting permission state or setting inhibition state of molding conditions can be selected. In the setting permission state, setting of molding conditions is permitted, and the setting values of molding conditions can be changed. This can enhance the security of the molding conditions of the injection molder 2.

(Second Embodiment)

The second embodiment will describe a modification to the first embodiment.

The registrant recognition unit 5 according to the first embodiment determines whether the setting permission state or setting inhibition state can be selected, on the basis of whether an ID and password which are input by the user coincide with an ID and password which are registered in advance.

In the second embodiment, biometrical authentication is performed using a fingerprint, voiceprint, iris, personal image, vein pattern, or the like, instead of the ID and password. For this purpose, a registrant recognition unit 5 in the second embodiment comprises a biometrical authentication unit.

Figure 12:
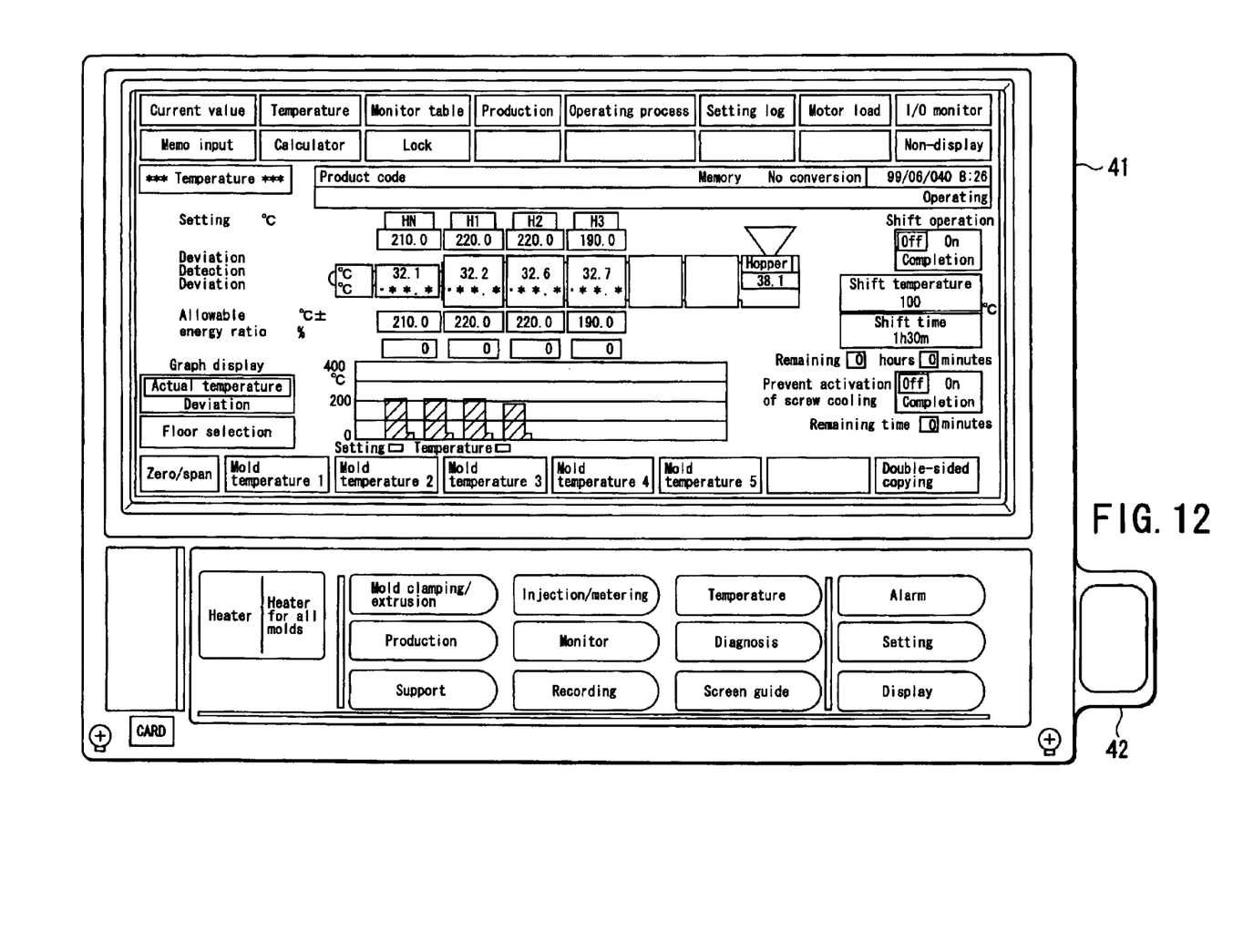
FIG. 12 is a front view showing an example of a display in a control device for an industrial machine according to the second embodiment of the present invention.

FIG. 12 is a view showing an example of a display device 41 in a control device 1 for an industrial machine according to the second embodiment.

The display device 41 comprises a biometrical authentication unit. The second embodiment adopts a fingerprint biometrical authentication unit 42 as an example of the biometrical authentication portion.

The person in charge stores his/her ID and fingerprint data in a registrant memory 5a in advance. Fingerprint data is input by touching the fingerprint biometrical authentication unit 42 with a finger, instead of a password input described in the first embodiment.

After the fingerprint is registered, biometrical authentication processing is done by only touching the fingerprint biometrical authentication unit 42 with an user's finger in operating the control device 1 without inputting any ID or password.

The iris may be used in place of the fingerprint. The iris is a portion on the eyeball surface, and is unique to each person, similar to the fingerprint. Biometrical authentication can be performed by reading the iris.

The vein pattern may replace the fingerprint or iris. The vein pattern of a finger, palm, or the like is read from the front side by irradiating the back side with strong light. The read vein pattern is a pattern unique to each person. Biometrical authentication can, therefore, be performed by reading the vein pattern.

An industrial machine may be controlled using a computer. In this case, the computer corresponds to the control device 1 of the industrial machine, and the computer executes the operation described in the above embodiments.

What is claimed is:

1. A control device for controlling an injection molder, comprising:

a registrant information storing portion that stores registrant information of registrants of the device;

a registrant recognition portion configured to receive user information input from a user of the injection molder and determine whether the user of the injection molder is a registrant of the device by matching the input user information with the registrant information stored in the registrant information storing portion;

an operation condition setting portion configured to output a setting of at least one operating condition of the injection molder inputted from the registrant of the device;

a permission control portion configured with at least two internal states including a setting inhibition state that prohibits the operation condition setting portion from outputting the setting of the at least one operating condition of the injection molder; and a display portion that displays information on a screen display;

wherein the screen display is divided into at least two regions such that each of the two regions display information to the registrant of the device to control the injection molder, wherein the display portion displays an indication for the setting inhibition state on the screen display; and wherein the permission control portion requests confirmation upon selecting the setting inhibition state when the indication is operated by the registrant of the device.

2. The device of claim 1, further comprising:

a log display portion that provides the display portion with setting log data based on the setting data outputted from the operating condition setting portion, wherein the display portion displays the setting log data provided by the log display portion.

3. The device of claim 1, wherein the permission control portion has a second setting inhibition state that prohibits the operation condition setting portion from outputting a setting of another operating condition of the injection molder which is different from the at least one operating condition of the injection molder.

4. The device of claim 1, wherein the registrant information includes an identification code and a password.

5. The device of claim 1, wherein the registrant information includes parameters selected from the group consisting of a fingerprint, a voiceprint, an iris, a personal image, and a vein pattern.

6. The device of claim 1, wherein the at least one operating condition of the injection molder is a molding condition of the injection molder.

7. The device of claim 1, further comprising:

an operating condition storing portion that receives and stores the setting of the at least one operating condition of the injection molder outputted by the operating condition setting portion.

8. The device of claim 1, wherein the two regions of the screen display are a main screen region and a sub screen region.

9. The device of claim 8, wherein the display portion includes:

a main screen memory that stores image information of the main screen region;

a sub screen memory that stores image information of the sub screen region;

a screen data memory that stores image information of the screen display, the screen data memory being different from the main screen memory and the sub screen memory; and a screen display unit configured to display the image information of the screen data memory on the screen display.

10. The device of claim 9, wherein the display portion further includes:

a screen controller configured to receive the image information of the main screen region from the main screen memory, to receive the image information of the sub screen region from the sub screen memory, and to output image information created on the basis of the image information of the main screen region and the image information of the sub screen region to the screen data memory.

11. The device of claim 10, wherein the screen controller creates the image information on the basis of data input from the registrant recognition portion.

12. The device of claim 9, wherein the display portion further includes a touch panel which is transparent and is attached to the screen display unit.

13. The device of claim 12, wherein the display portion further includes a direct screen selection unit comprising a button on the main screen region, wherein, when the button on the main screen region is touched, a screen corresponding to the touched button on the main screen region is displayed in the main screen region.

14. The device of claim 12, wherein the touch panel is attached to the entire sub screen region;

wherein a current value button is displayed on the sunscreen region, wherein, when the current value button is touched, the sub screen region displays current state information of the injection molder.

15. The device of claim 14, wherein the current state information includes information regarding one or more of the group consisting of injection time, cooling time, medium time, screw position, die plate position, extrusion position, injection pressure/back pressure, clamping force, and screw speed.

16. The device of claim 13, wherein the display portion further includes an input signal controller configured to receive information from the touch panel and the direct screen selection unit and to output information to the screen controller.

17. The device of claim 16, further comprising:

an input setting unit that receives, via the touch panel and the input signal controller, at least information about operating conditions and the user information, and outputs at least the user information to the registrant recognition portion.

18. The device of claim 1, wherein the indication for the setting inhibition state on the screen includes an execute confirmation button of lock function.

19. The device of claim 8, wherein the main screen region displays controller function switches for operating a controller function of the injection molder and setters for setting molding conditions of the injection molder.

20. The device of claim 18, wherein the sub screen region displays monitoring data to be displayed in succession.

21. The device of claim 8, wherein the sub screen region displays at least a current value button, a temperature button, a monitor table button, a production button, and a non display button.

22. The device of claim 8, wherein the at least two internal states of the permission control portion include a setting permission state that permits the operation condition setting portion to output the setting of the at least one operating condition of the injection molder;

wherein the sub screen display displays a lock button when the permission control portion selects the setting permission state, and wherein the sub screen display displays an unlock button when the permission control portion selects the setting inhibition state.

23. The device of claim 22, wherein the display portion displays a window for inputting the user information when the unlock button is touched.

24. The device of claim 23, wherein the display portion displays a lock confirmation window when the lock button is touched.

25. The device of claim 8, wherein the display portion displays a registrant information setting screen to store registrant information of a new registrant into the registrant information storing portion if the registrant of the device is a person in charge.

26. The device of claim 25, wherein the registrant information setting screen has a password input button and a screen setting button;

wherein a first window opens when the password input button is touched, and wherein a second window opens when the screen setting button is touched.

27. The device of claim 2, wherein the display portion displays a log screen based on the setting log data;

wherein the log screen comprises identification codes of persons who performed set operations.

28. The device of claim 1, wherein the display portion further comprises a fingerprint biometrical authentication unit;

wherein the registrant information includes an identification code and fingerprint data, and wherein the registrant recognition portion performs biometrical authentication processing without an input of the identification code when the fingerprint biometrical authentication unit is touched with a finger of the registrant of the device.

* * * * *